United States Patent [19]
McCardle, Jr. et al.

[11] 3,814,325
[45] June 4, 1974

[54] VARIABLE AREA CONVERGENT-DIVERGENT EXHAUST NOZZLE

[75] Inventors: Arthur McCardle, Jr.; Robert Lee Sponseller, both of Cincinnati; Charles Henry Gross, Lebanon, all of Ohio

[73] Assignee: General Electric Company, Lynn, Mass.

[22] Filed: June 18, 1973

[21] Appl. No.: 371,056

[52] U.S. Cl. .................... 239/265.39, 181/33 HD
[51] Int. Cl. .................... B64d 33/04, B64c 9/38
[58] Field of Search..... 239/265.11, 265.19, 265.33, 239/265.37, 265.39, 265.41; 181/33 HD

[56] References Cited
UNITED STATES PATENTS

| | | | |
|---|---|---|---|
| 3,038,304 | 6/1962 | Alford........................... | 239/265.41 |
| 3,044,258 | 7/1962 | Carlton et al. .......... | 239/265.33 UX |
| 3,188,803 | 6/1965 | Maguire...................... | 239/265.39 |
| 3,403,858 | 10/1968 | Kurti et al..................... | 239/265.39 |
| 3,592,389 | 7/1971 | Johnson..................... | 239/265.39 X |
| 3,599,875 | 8/1971 | Wynosky et al. .......... | 239/265.37 X |
| 3,638,862 | 2/1972 | Wildner....................... | 239/265.39 |
| 3,662,957 | 5/1972 | Pinto et al. .................. | 239/265.39 |

*Primary Examiner*—Robert S. Ward, Jr.
*Attorney, Agent, or Firm*—Edward S. Roman

[57] ABSTRACT

A simple variable area convergent-divergent exhaust nozzle is provided for an aircraft propulsion system for operation at both subsonic and supersonic aircraft speeds. The variable area exhaust nozzle comprises a system of inner primary flaps which may be simultaneously pivoted and translated about the nozzle axis so as to define a first convergent slightly divergent nozzle suitable for efficient subsonic operation and a second convergent-divergent nozzle suitable for efficient supersonic operation. A system of outer secondary flaps are arranged to pivot in cooperation with the primary flaps so as to define an outer surface which incurs a low external drag through all modes of flight operation.

10 Claims, 4 Drawing Figures

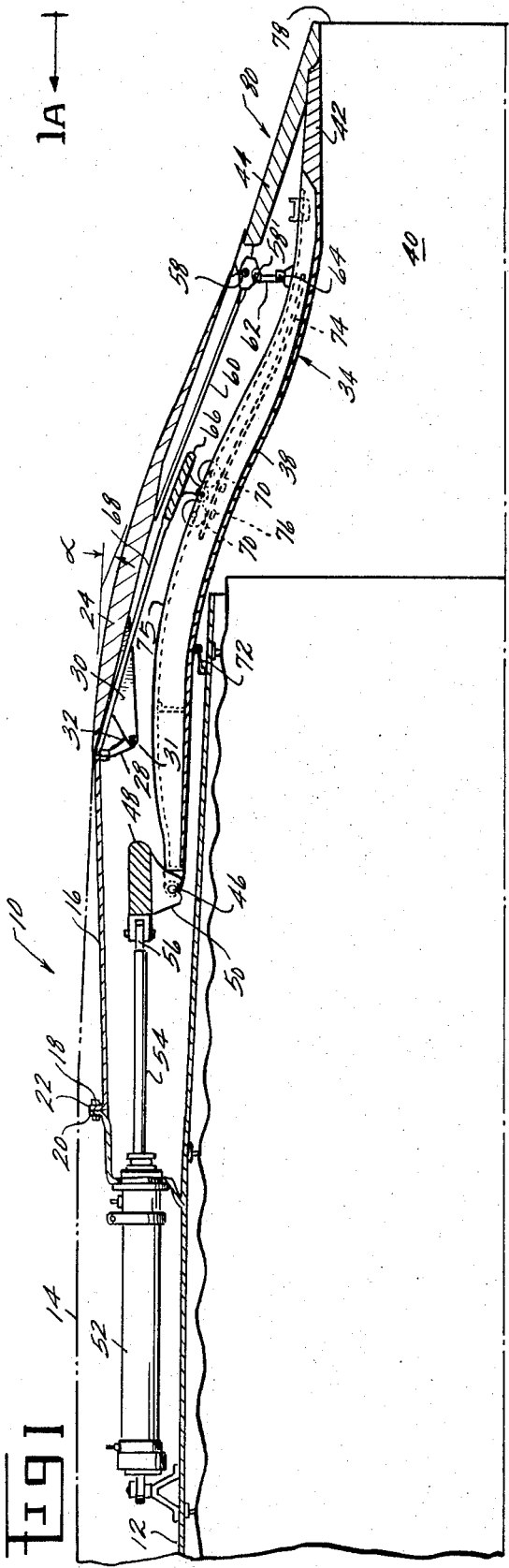
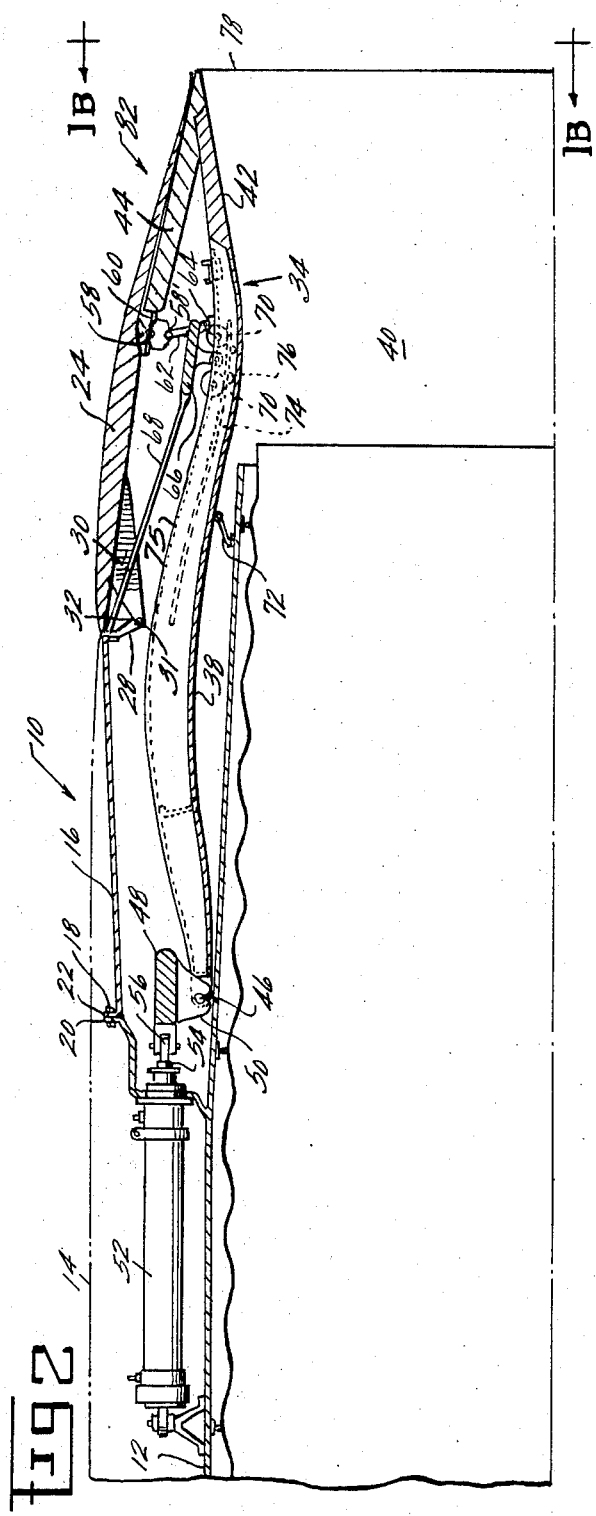

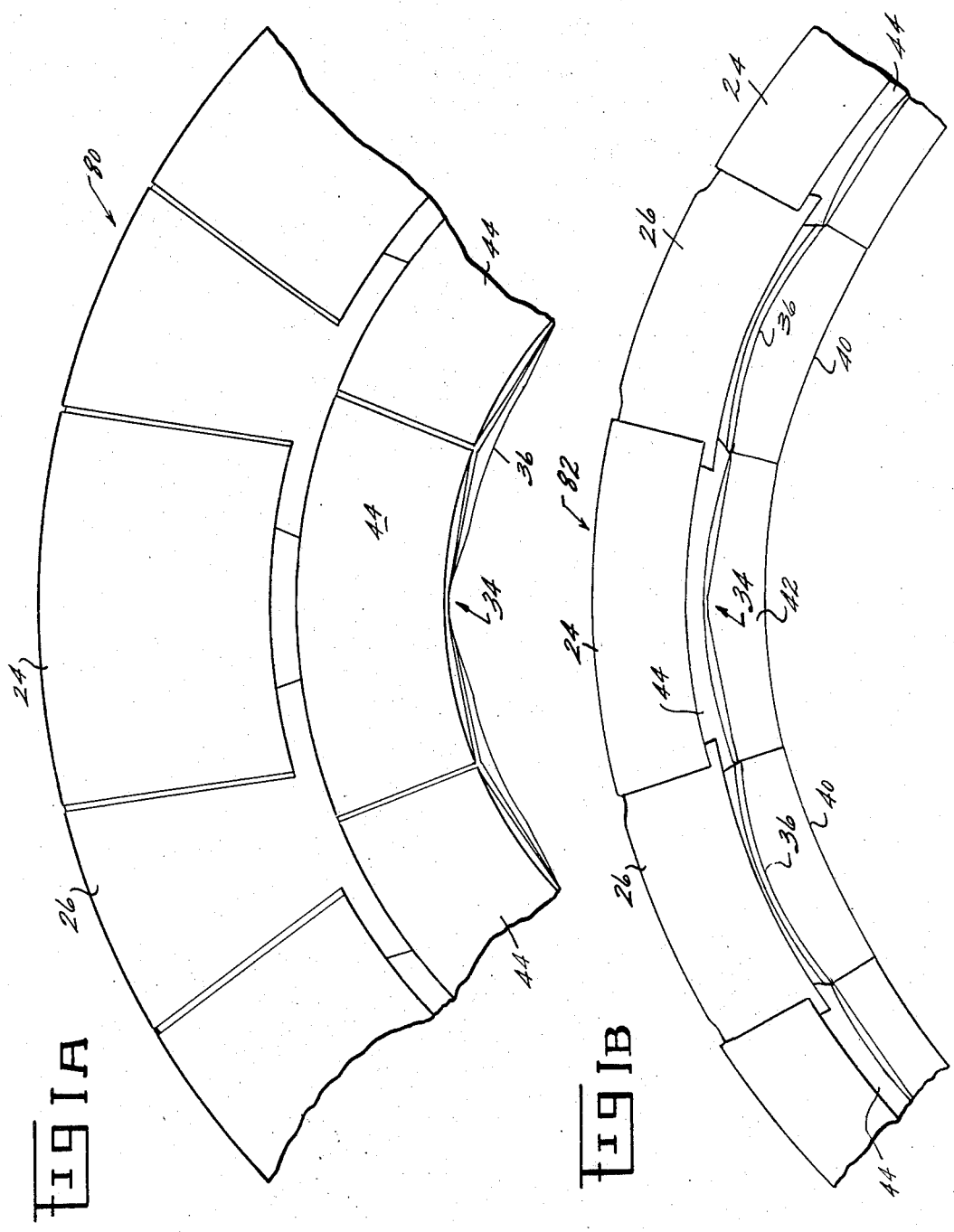

VARIABLE AREA CONVERGENT-DIVERGENT EXHAUST NOZZLE

BACKGROUND OF THE INVENTION

In general, this invention relates to a variable area convergent-divergent exhaust nozzle and, more particularly, to a simplified variable area convergent-divergent exhaust nozzle for a supersonic gas turbine engine wherein the exhaust nozzle configuration has low external drag characteristics at subsonic and supersonic speeds.

The invention herein described was made in the course of or under a contract or subcontract thereunder, or grant, with the Department of the Air Force.

In the design of exhaust nozzles which are adaptable for both subsonic and supersonic aircraft operation, wherein the supersonic operation may be augmented by afterburning, it is desirable to make the nozzle adjustable so that it performs as either a convergent or convergent slightly divergent nozzle at subsonic aircraft speeds and as a convergent-divergent nozzle at transonic and supersonic speeds. For successful operation such a nozzle must accelerate the exhaust gases efficiently and the external or base drag of the nozzle must be maintained at a minimum. From the standpoint of internal performance, it is desirable to have a nozzle in which both the throat area and exit area are variable without interposing any blockage in the interior of the exhaust stream as is the case for the plug type nozzle. From the standpoint of external performance the exterior form of the nozzle must be adjustable so that the base drag characteristics of the nozzle may be held to a minimum during both subsonic and supersonic operation.

Past efforts at improving the internal performance of an exhaust nozzle adaptable for both subsonic and supersonic operation have resulted in nozzles which perform efficiently under certain operating conditions, but which have consequent compromises in performance at other operating conditions. This may mean that the exhaust nozzle displays efficient external performance at supersonic speeds, but has high base drag characteristics at subsonic speeds or vice versa.

Therefore, it is a primary object of this invention to provide a variable area convergent-divergent exhaust nozzle which avoids such compromises in performance, and thereby provides for maximum performance and minimum base drag over a wie range of aircraft speeds.

It is also an object of this invention to provide a variable area convergent-divergent exhaust nozzle which provides for maximum thrust of the propulsion system and operates efficiency with minimum base drag at both subsonic and supersonic aircraft speeds.

It is a further object of this invention to provide a simplified variable area convergent-divergent exhaust nozzle whereby optimum expansion areas may be obtained at subsonic and supersonic aircraft speeds without the necessity for the dual actuating and control systems of conventional variable area convergent-divergent exhaust nozzles.

SUMMARY OF THE INVENTION

The above described objects of this invention are accomplished by a variable area convergent-divergent exhaust nozzle having an outer, generally cylindrical, casing. A plurality of circumferentially spaced apart secondary flaps are pivotally connected to the downstream end of the cylindrical casing. There is also included a unison ring translatably disposed in relation to the center axis of the casing. A plurality of circumferentially spaced apart primary flaps are pivotally connected at their forward ends to the unison ring wherein each primary flap includes: a convergent portion, a throat portion downstream of the converging portion, a diverging portion downstream of the throat portion, and an overlapping outer portion which slidingly engages a respective secondary flap such that the secondary flaps pivot simultaneously with the primary flaps. Guide means are provided whereby the primary flaps may be pivoted radially inward about the unison ring upon downstream translation of the unison ring and radially outward about the unison ring upon upstream translation of the unison ring. Actuating means are also provided for translating the unison ring.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a cross-sectional view of the aft portion of a propulsion system embodying the variable area convergent-divergent exhaust nozzle of this invention as adjusted for subsonic operation.

FIG. 1A is an enlarged cross-sectional view taken along the line 1A — 1A of FIG. 1.

FIG. 2 is an enlarged cross-sectional view of the aft portion of the propulsion system of FIG. 1 embodying the variable area convergent-divergent exhaust nozzle as adjusted for supersonic operation.

FIG. 1B is a cross-sectional view taken along the line 1B — 1B of FIG. 2.

DESCRIPTION OF THE PREFERRED EMBODIMENT

Referring to FIGS. 1 and 2, there is shown at 10 the variable area convergent-divergent exhaust nozzle of this invention arranged to receive a flow of exhaust gases from a conventional gas turbine engine (not shown) of any suitable type as is well known in the art. The exhaust gases exit from the gas turbine engine through a conventional aft exhaust duct or tailpipe 12 which is also of a type well known in the art. The gas turbine engine and aft exhaust duct 12 are generally enclosed by an aircraft nacelle or fuselage designated by the phantom line 14 in order to minimize the resistance of the atmosphere to their passage therethrough. The aircraft nacelle 14 may follow any form suitable to specific aircraft applications, as is well known to those skilled in the art, and is therefore only schematically indicated.

The variable area convergent-divergent exhaust nozzle 10 includes an outer cylindrical casing 16 supported by the aft exhaust duct 12 through a plurality of circumferentially spaced apart bolts 18 which engage abutting circumferential flanges 20, 22 formed integral to the exhaust duct 12 and cylindrical casing 16 respectively. A plurality of circumferentially spaced apart secondary flaps 24 are pivotally connected to the downstream end of the cylindrical casing 16 through a plurality of extended arms 28, 30 which are rotatably pinned at 31. Referring now to FIGS. 1A and 1B, there are shown a plurality of secondary seal members 26 alternated with the secondary flaps 24 to form a continuous surface as the flaps and end seals are pivoted about the cylindrical casing 16, this being a well known feature of those skilled in the art.

The convergent-divergent exhaust nozzle 10 further includes a plurality of circumferentially spaced apart primary flaps 34, each of which is contoured to define a converging portion 38, a throat portion 40, a divergent portion 42, and an overlapping outer portion 44. In like manner, a plurality of primary seal members 36 may be alternated with the primary flaps 34 to form a continuous surface. The upstream end of each primary flap 34 is pivotally connected at 46 to a clevis 50 extending radially inward from a unison ring 48, which is disposed for translation parallel to the nozzle axis. The converging portions 38 of the primary flaps 34 are maintained in sealing engagement to the downstream end of the aft exhaust duct 12 by an annular gland seal 72. There are further included a plurality of spaced apart actuators 52 disposed about the circumference of the aft exhaust duct 12 in driving connection to the unison ring 48 through respective drive rods 54 and uniball bearings 56.

The upstream end of the overlapping outer portion 44 of each primary flap 34 rotatably connects to two spaced rollers 58, 58' which, in turn, engage a longitudinal track 60 from an adjacent secondary flap 24. Structural support between the upstream end of the overlapping outer portion 44 and the throat portion 40 of the primary flaps 34 are provided by interconnecting links 62 which are rotatably pinned at 58' and 64.

Intermediate the secondary flaps 24 and the primary flaps 34, there is provided a circumferential support ring 66 maintained in fixed connection relative to the cylindrical casing 16 through an interconnecting conical section 68. A plurality of circumferentially spaced apart rollers 70 are provided in rotatable connection to the inside of the support ring 66 for respective engagement with a plurality of circumferentially spaced apart converging tracks 74, each of which is fixedly connected to a primary flap 34 by a longitudinally extending rib member 75. A plurality of side rollers 76 are also rotatably connected to the support ring 66 in order to maintain the alignment and concentricity of the primary flaps 34. This alignment, in turn, assures effective sealing between the primary flaps 34 and the circumferential gland seal 72.

FIG. 1 shows the closed position of the variable convergent-divergent exhaust nozzle 10 employed when the pressure of the motive fluid is at a minimum, corresponding to subsonic operation. Actuators 52 are operated to extend the drive rods 54 rearwardly and thereby translate the unison ring 48 and primary flaps 34 to their extreme downstream positions. It will also be appreciated that the primary flaps 34 are pivoted radially inwardly through rolling engagement between the converging tracks 74 and roller 50. The overlapping outer portions 44 of the primary flaps 34 are also translated rearwardly and inwardly out of telescoping engagement within the secondary flaps 24 which are, in turn, simultaneously pivoted radially inward through rotatable engagement between the rollers 58, 58' and track 60, so as to define a conical afterbody 80 for the nacelle 14. In this position the nozzle operates as a convergent-slightly divergent exhaust nozzle wherein the nozzle throat portion 40 occupies a minimum diameter and the pressure of the motive fluid is relatively low having a value of the order of 2 to 4 atmospheres corresponding to non-augmented subsonic operation. The discharge orifice 78 defined by the trailing edges of the primary flaps 34 is only slightly larger than the throat portion 40 with the divergent portions of the primary flaps 34 nearly parallel to the axis of the nozzle to prevent over-expansion of the motive fluid which might otherwise occur, thus enhancing nozzle efficiency. As is readily apparent the upstream ends of the secondary flaps 24 are gradually curved into the nacelle 14 so as to provide a smooth and uniformly flared flow surface without discontinuities which could enhance external drag.

As the speed of the gas turbine engine is accelerated, the pressure of the motive fluid increases and the actuators 52 may be operated to retract the drive rods 54 thereby translating the unison ring 48 and primary flaps 34 to their extreme upstream positions corresponding to a convergent-divergent nozzle. As is readily apparent, the primary flaps are also pivoted radially outward through rolling engagement between the converging tracks 74 and rollers 70. The overlapping outer portions 44 of the primary flaps 34 translate forwardly and outwardly into telescoping engagement within the secondary flaps 24 which, in turn, are simultaneously pivoted radially outward, through rotatable engagement between the rollers 58, 58' and track 60 so as to form a slightly converging extension 82 of the nacelle 14. In this position, the convergent-divergent nozzle is defined by the converging portions 38, throat portions 40 and diverging portions 42 of the primary flaps 34 which furnish complete guidance of the expansion process by restricting sidewise expansion of motive fluid while providing a rearward facing area for the motive fluid to exert reaction upon.

The angle $\alpha$ at which the outer surface of the secondary flaps 24 intersects the nacelle 14 is commonly referred to as the boat-tail angle and it is this angle which determines the base drag along the nacelle and nozzle. The external pressure of the ambient air flow along the outside of the nacelle remains fairly constant until reaching the outside converging surface 82 of the secondary flaps 24, whereupon the flow momentarily separates from the outside surface of the nozzle and the static pressure drops sharply. If the boat-tail angle is kept relatively small, as in FIG. 2, the flow quickly reattaches to the secondary flaps and the static pressure is again restored. As now becomes readily apparent, the distance which the ambient airflow must travel along the length of the nozzle before reattaching to the outside surface of the secondary flaps 24 depends upon the boat-tail angle. If the boat-tail angle is increased, then the ambient airflow separation and its accompanying reduction in static pressure will continue over a greater portion of the length of the nozzle resulting in an increase in the overall drag along the nacelle and nozzle.

The convergent-divergent nozzle configuration of FIG. 2 approaches the optimum external nozzle configuration for efficient operation at supersonic flight speeds. The boat-tail angle is nearly zero and the outer surface of the nozzle defines only a slightly converging surface 82. This configuration permits the shockless flow of ambient air along the nacelle and nozzle, since there are no discontinuities which can generate a shock wave. In this connection, the lines of the nacelle and afterbody need not be absolutely parallel to the longitudinal axis thereof for shockless flow, but need be only approximately parallel as shown in FIG. 2. In addition the outer surfaces of the secondary flaps 24 are gradually and smoothly contoured into the nacelle to prevent generation of shock waves along the nacelle and nozzle. Since the contours of the nacelle and nozzle are smooth and since the curvature of the secondary flaps 24 is gradual, any disturbances in the airflow at this point will result in only a minimum separation of the airflow from the outer surface of the secondary flaps 24. Accordingly, the nozzle of this invention will operate with near shockless flow near peak efficiency at supersonic speeds.

Of additional advantage is the simplicity of the convergent-divergent exhaust nozzle of this invention whereby near optimum expansion areas may be obtained at all modes of flight operation without the necessity for the dual actuators and controls of conventional variable nozzle systems. As becomes readily apparent, the reduced number of parts permits a reduction in the overall weight of the nozzle and facilitates ease of manufacture, assembly and repair. In addition, whereas the nozzle is stowed behind the aft exhaust duct 12 during maximum power operating conditions, there can be a reduction in the overall amount of low temperature air required to cool the nozzle parts. This results in higher engine performance together with a reduced aircraft weight whereas a lesser amount of engine air is needed to cool the nozzle providing an increase in the amount of air which may be utilized for burning fuel.

Thus the nozzle configuration of this invention when in the convergent-divergent mode of operation for supersonic flight as shown in FIGS. 2 and 1B conforms very closely to the ideal configuration for supersonic flight. In addition when the nozzle is in the closed position for subsonic flight as shown in FIGS. 1 and 1A, external drag is reduced to a minimum and internal nozzle performance is optimized by the reduction of losses due to uncontrolled expansion.

Therefore, while a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What is claimed is:

1. A variable area convergent-divergent exhaust nozzle comprises:
   an outer generally cylindrical casing;
   a plurality of circumferentially spaced apart secondary flaps pivotally connected to the downstream end of the cylindrical casing;
   a unison ring translatably disposed in relation to the center axis of the casing;
   a plurality of circumferentially spaced apart primary flaps pivotally connected at their forward ends to the unison ring wherein each primary flap includes: a converging portion, a throat portion downstream of the converging portion, a diverging portion downstream of the throat portion, and an overlapping outer portion which slidingly engages a respective secondary flap such that the secondary flaps pivot simultaneously with the primary flaps;
   guide means whereby the primary flaps are pivoted radially inward about the unison ring upon downstream translation of the unison ring and radially outward about the unison ring upon upstream translation of the unison ring;
   and actuating means for translating the unison ring.

2. The exhaust nozzle of claim 1 wherein:
   each secondary flap includes a secondary track extending along a portion of the longitudinal length thereof and engaged by secondary rollers connected to the overlapping outer portion of an adjacent primary flap whereby the overlapping outer portions of the primary flaps may be telescoped into and out of engagement with the secondary flaps by translation of the unison ring, and
   the guide means include a plurality of converging primary tracks each of which extends along a portion of the longitudinal length of a primary flap and is engaged by primary rollers maintained in fixed relation relative to the cylindrical casing.

3. The exhaust nozzle of claim 2 including:
   a circumferential support ring rotatably connecting the primary rollers and a conical section interconnecting the circumferential support ring with the cylindrical casing.

4. The exhaust nozzle of claim 2 including: a plurality of primary seal members alternated with the primary flaps to form a continuous surface, and a plurality of secondary seal members alternated with the secondary flaps to form a second continuous surface.

5. The exhaust nozzle of claim 2 wherein the actuating means includes:
   a plurality of circumferentially spaced apart actuators which drivingly connect to the unison ring through respective drive rods and uniball bearings.

6. In a gas turbine engine having an aft exhaust duct and an outer nacelle, there is provided a variable area-convergent-divergent exhaust nozzle in downstream serial flow relation to the exhaust duct wherein the exhaust nozzle comprises:
   an outer generally cylindrical casing connecting the downstream end of the exhaust duct;
   a plurality of circumferentially spaced apart secondary flaps pivotally connected to the downstream end of the cylindrical casing defining an outer surface extending downstream of the nacelle;
   a unison ring translatably disposed in relation to the center axis of the casing;
   a plurality of circumferentially spaced apart primary flaps pivotally connected at their forward ends to the unison ring wherein each primary flap includes: a converging portion, a throat portion downstream of the converging portion, a diverging portion downstream of the throat portion and, an overlapping outer portion which slidingly engages a respective secondary flap such that the secondary flap pivot simultaneously with the primary flaps;
   guide means whereby the primary flaps are pivoted radially inward about the unison ring upon downstream translation of the unison ring and radially outward about the unison ring upon upstream translation of the unison ring;

and actuating means for translating the unison ring.

7. The exhaust nozzle of claim 6 wherein:
each secondary flap includes a secondary track extending along a portion of the longitudinal length thereof and engaged by secondary rollers connected to the overlapping outer portion of an adjacent primary flap whereby the overlapping outer portions of the primary flaps may be telescoped into and out of engagement with the secondary flaps by translation of the unison ring; and
the guide means include a plurality of converging primary tracks each of which extends along a portion of the longitudinal length of a primary flap and is engaged by primary rollers maintained in fixed relation relative to the cylindrical casing.

8. The exhaust nozzle of claim 7 including:
a circumferential support ring disposed intermediate the primary and secondary flaps for rotatably connecting the primary rollers, and a conical section interconnecting the circumferential support ring with the cylindrical casing.

9. The exhaust nozzle of claim 7 including:
a plurality of secondary seal members alternated with the secondary flaps to form a continuous surface which is gradually and smoothly contoured into the nacelle so as to present no discontinuities which might generate shock waves or flow separation along the nacelle and nozzle, and a plurality of primary seal members alternated with the primary flaps to form a second continuous surface.

10. The exhaust nozzle of claim 7 wherein the actuating means includes:
a plurality of circumferentially spaced apart actuators disposed about the nacelle in driving connection to the unison ring through respective drive rods and uniball bearings.

* * * * *